April 30, 1940.    E. A. SPERRY, JR    2,199,118
MAGNETIC COMPASS
Filed May 18, 1938
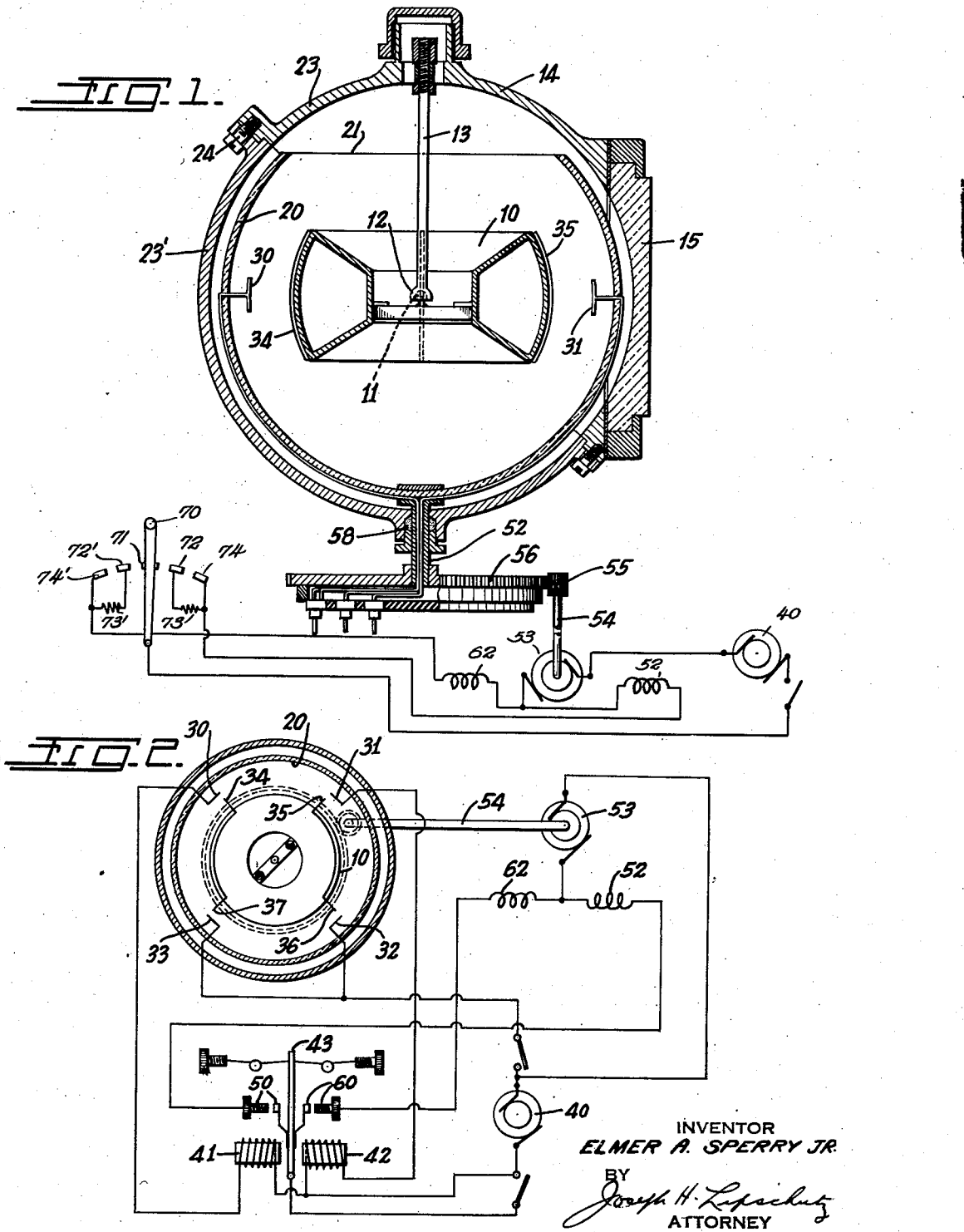
INVENTOR
ELMER A. SPERRY JR.
BY
Joseph H. Lipschutz
ATTORNEY Patented Apr. 30, 1940

2,199,118

UNITED STATES PATENT OFFICE 2,199,118

MAGNETIC COMPASS

Elmer A. Sperry, Jr., New York, N. Y., assignor to Sperry Products, Inc., Brooklyn, N. Y., a corporation of New York Application May 18, 1938, Serial No. 208,507

1 Claim. (Cl. 33—223)

This invention relates to indicating instruments of the type in which the movements of a direction-responsive or position-responsive member are damped by means of a liquid in which said member is immersed. Thus, for example, it is common practice to mount the magnetic element of a magnetic compass in a bowl filled with liquid, the said bowl being fixed upon a moving craft. One of the great objections to this arrangement arises from the fact that when the craft and the liquid-filled container mounted on the craft turn or otherwise move relative to the magnetic element which tends to remain fixed in space, the body of liquid within the container is also moved with the container and the friction between the liquid and the magnetic element tends to drag the magnetic element around with it. Thus, if an aircraft makes a complete turn in azimuth, it is found that the magnetic element does not retain its position in space, that is, continue to point north, but said element is dragged around. It will be understood that for a considerable lapse of time after turning of the craft begins, the magnetic element is useless as a direction indicating element, and other instruments must be employed during this interval for the purpose of guiding the movements of the craft. Various means have been proposed to reduce the amount of drag which the liquid in the moving container exerts upon the magnetic element, such as providing a relatively large space between the periphery of the magnetic element and the wall of the container. This, however, resulted in an instrument of such size as to make its use prohibitive on vehicles such as aircraft. Also, various liquids have been employed with a view to reducing the viscosity factor and hence reducing the drag.

The present invention has for its principal object the provision of a solution for the problem outlined above, which will enable a small instrument to be employed, as well as any desired fluid, regardless of viscosity. For this purpose there is provided a container within a container, the first container being interposed between the responsive element and the outer container, in combination with means for causing said inner container to maintain a substantially fixed relationship with respect to the responsive element.

Further objects and advantages of this invention will become apparent in the following detailed description.

In the accompanying drawing:

Fig. 1 is a vertical section through an instrument embodying my invention and showing the wiring diagram of the electrical connections.

Fig. 2 is a wiring diagram illustrating a modified form of my invention.

Referring to Fig. 1 of the drawing, I have shown my invention as applied to a magnetic compass, although it will be understood that the invention has applicability to other indicating instruments and mechanisms wherein the same problem exists, that is to say, where there is a responsive element within a liquid filled container, and the container is subjected to relative movement with respect to the responsive element. In the present case, the magnetic element may take the form of a hollow float 10 whose buoyancy causes its pivot 11 to engage in the cup-shaped bearing 12 at the end of a pivot post 13 fixed in any suitable manner in a container 14 which is filled with liquid. The float 10 may be magnetized so that it is in and of itself a magnet, or separate magnets may be mounted thereon. In either case, the float 10 will tend to maintain itself in the magnetic meridian and therefore will tend to be relatively fixed in space. The container 14 is in this instance shown as spherical and provided with a front window 15 so that the markings on the outer surface or float 10 may be read. The container 14 is adapted to be fixedly mounted on a moving vehicle such as an aircraft, and as the craft turns in azimuth the magnetic element 10 should theoretically maintain its fixed position in the magnetic meridian and hence disclose the direction in azimuth to the operator viewing the same through window 15.

The above theoretical action of the compass is impaired by reason of the fact that the distance between the outer wall of magnetic element 10 and the wall of casing 14 is necessarily limited because the size of the instrument which may be mounted on an aircraft is necessarily small. When the aircraft turns, and, hence, when container 14 turns relative to element 10, it will be understood that the body of liquid which fills container 14 also turns with the container and thus gives rise to a drag which the liquid exerts upon the element 10, causing said element also to travel around in azimuth after a certain lag, to follow the movements of the craft. It will readily be understood that this renders the compass inaccurate and in fact inoperative during the interval that turning occurs and for a considerable interval thereafter, until the responsive element can again align itself in the magnetic meridian. To obviate this condition, I have provided the solution which consists of an inner container or bowl interposed between the outer container 14 and the magnetic responsive element 10, together with means whereby the said inner container is moved to a degree equal to that of container 14, but in an opposite direction, whenever said container turns in azimuth, so that the position of the inner container with respect to the magnetic responsive element remains unchanged regardless of the degree of movement of the craft and container 14 in azimuth. Therefore, no swirl or liquid drag is caused to act on the magnetic responsive element 10 since the entire fluid frictional force is exerted on the outer surface of the inner container and is overcome in a manner about to be described.

The said inner container 20 may have substantially the same form as the outer container 14, in this case spherical, but cut off at 21 to allow the magnetic responsive element to pass therein. The diameter of inner bowl 20 is slightly less than that of outer bowl 14, so that the fluid within the container will fill the space between said bowls. The container 14 may comprise two parts 23 and 23' bolted together at 24, to permit the bowl 20 to pass therein. When the craft and container 14 turn in azimuth, the liquid within container 14 is also carried around in azimuth, and this will tend to carry inner bowl 20 along with the liquid because of the friction between the liquid and said inner bowl. If means could be provided for moving container 20 in a direction in azimuth opposite to the direction of movement of container 14 and to the same degree, then it will be understood that container 20 and magnetic responsive element 10 would retain their fixed position in space and hence there would be no movement of liquid between container 20 and the magnetic responsive element, with the result that said element would not be displaced by the moving liquid whenever the craft turned in azimuth. For accomplishing this purpose I have provided the following arrangement which is an electrolytic relay system as shown in the patent to Edward L. Holmes, No. 1,702,404, granted Feb. 19, 1929. The said relay system includes a set of four electrodes 30, 31, 32 and 33 with which cooperate a second set of electrodes 34, 35, 36, 37. The first set of electrodes is mounted on the container 20, while the second set of electrodes is mounted on the responsive element 10. The liquid within the container 14 is an electrolyte and tends to complete the circuit between the fixed and movable electrodes. The said circuit originates in a source of current 40 which supplies current to two relays 41 and 42 which act on a common armature 43. The current from relay 41 extends to electrode 30 through the electrolyte, electrode 34, electrode 37, through the electrolyte, electrode 33 to source 40. The circuit from relay 42 extends through electrode 31 through the electrolyte, electrode 35, electrode 36, through the electrolyte, electrode 32 and return to the source 40. The movable electrodes normally are arranged to be positioned adjacent the ends of the fixed electrodes so that should any movement of container 20 take place it would tend to carry one or the other set of fixed electrodes out of cooperative relation with the movable electrodes to cause an increased path for the current through the electrolyte while the other set of movable electrodes would maintain substantially the same distance through the electrolyte to the fixed electrodes. Thus, for instance, if container 20 tended to be dragged around with container 14 in a clock-wise direction, in Fig. 2, it will be seen that electrodes 31 and 32 would be moved in a direction such that the distance between them and the electrodes 35 and 36 would increase, thus causing a longer path for the current through the electrolyte and therefore causing the current through relay 42 to decrease. At the same time, the distance through the electrolyte between electrodes 30, 33 on the one hand and electrodes 34 and 37 on the other, would be unchanged and hence the current through relay 41 would not be reduced. This means that relay 41 would attract armature 43 to close a set of contacts 50 and thus close a circuit through field 52 of motor 53 which is then caused to rotate container 20 in such direction as to restore the electrodes carried by the container 20 to their original position with respect to the electrodes carried by the responsive element 10. For this purpose the shaft 54 of the motor armature is geared to the container 20 by means of gearing 55, 56, the latter gearing being carried by a journal 57 which extends through container 14 and is fixed to container 20. A packing gland 58 is provided in the bearing through which journal 57 extends. The said journal may be hollow so that the leads from generator 40 to the electrodes 30—33 may extend therethrough. It will be understood that if turning occurs in a direction which tends to move container 20 in a counterclockwise direction in Fig. 2, then electrodes 30 and 33 will tend to increase the distance through the electrolyte to electrodes 34 and 37, thus causing current to drop in magnet 41 and permitting magnet 42 to attract armature 43 to close contacts 60 to energize the other field 62 of motor 52 and thus rotate shaft 54 and hence container 20 in a clockwise direction to restore the electrodes to their original position.

By the above arrangement it will be seen that as soon as container 20 tends to rotate with container 14 there is set up a means for moving container 20 back a distance equal to the movement of container 14. Thus, the inner container 20 will always be maintained substantially fixed in space regardless of the turning movements of the outer container 14. Since the responsive element 10 also normally maintains its position fixed in space, there will be no movement of the body of liquid past element 10 to tend to drag the same therewith and therefore the said responsive element will maintain its position in the magnetic meridian regardless of the turning movements of the outer container 14.

As just described, the turning of the inner bowl 20 has been accomplished automatically by utilizing the relative movement between the outer and inner bowls which occurs whenever turning takes place. If desired, however, the turning of the inner bowl may be controlled manually by the operator of the craft. Thus, whenever the craft is about to effect a turn, the operator may take hold of a switch handle 70 and operate it in one direction or the other, corresponding to the desired direction of turn. Thus, if the craft is to be turned to the right, for example, the operator may move switch handle 70 to the right to cause a contact 71 carried thereby to engage a contact 72. This will energize the motor field 52 to turn the inner bowl at a predetermined rate. This rate may be a relatively slow rate as determined by a resistance 73 interposed in the field circuit, so that an operator may make a turn at the rate of, for example, 180° in two minutes. If a fast turn is desired, the operator may move the switch handle 70 until contact 71 energizes contact 74 which short-circuits the resistance 73 to allow more current to reach the field 52 and hence operate the motor 53 at a faster rate corresponding to, for example, a 180° turn in 45 seconds. Similarly, if turning in the opposite direction is desired, the switch handle 70 may be moved to cause contact 71 to engage contact 72' or contact 74', the latter being adapted to short-circuit a resistance 73' in the other field 62 of motor 53. Instead of a switch handle 70 carrying contact 71, four sets of push buttons may be provided to make the four sets of contacts previously described.

By the above described mechanism, an operator of an aircraft about to make a slow turn causes contact 71 to engage contact 72 or 72', depending upon the direction of turn, for a slow turn, or contact 74 or 74' for a rapid turn. This causes the inner bowl 20 to be rotated in a direction opposite to the desired direction of turn of the craft at the predetermined speed and enables the pilot to fly his craft around the turn at the desired speed. Thus, if the desired rate of turn is 180° in two minutes and the operator has caused contact 71 to engage contact 72 or 72', then the operator need only take care to turn his craft so that a marking on the outer surface of container 28 remains fixed in position with respect to a lubber line on window 15, and this will indicate to the operator that he is turning at the proper rate. In other words, his craft is turning in a direction equal and opposite to the predetermined rate and direction of turn of the inner bowl 20.

The inner bowl 20 may be of glass and therefore transparent, in which case the markings may be placed either upon the periphery of float 18 or upon the outer surface of the container 20, or the container 20 may be opaque, in which case the markings are necessarily carried on the outside surface of said bowl.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other equivalent means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

In an indicating instrument adapted to be mounted on a moving craft, a container having fluid therein and fixed to the craft, a meridian-seeking element in said container movable with respect to the container and the craft, a second container interposed between said first container and said element, and means for rotating said second container about a normally vertical axis in either direction at a selected one of a plurality of predetermined speeds, said element carrying azimuth indicating indicia, said second container being transparent and said first container having a transparent portion whereby said indicia may be viewed, said second container also carrying indicia, whereby fixed relationship of the indicia on said element and said second container during turning of the craft will indicate to the operator that the craft is turning at the predetermined speed of rotation of the second container.

ELMER A. SPERRY, Jr.